(12) United States Patent
Edge

(10) Patent No.: US 7,433,103 B2
(45) Date of Patent: Oct. 7, 2008

(54) SELECTIVE FLATTENING OF PAGE DESCRIPTION FILES TO SUPPORT COLOR CORRECTION

(75) Inventor: Christopher J. Edge, St. Paul, MN (US)

(73) Assignee: Eastman Kodak Company, Rochester, NY (US)

( * ) Notice: Subject to any disclaimer, the term of this patent is extended or adjusted under 35 U.S.C. 154(b) by 706 days.

(21) Appl. No.: 11/025,690

(22) Filed: Dec. 29, 2004

(65) Prior Publication Data

US 2005/0219577 A1 Oct. 6, 2005

Related U.S. Application Data

(60) Provisional application No. 60/533,688, filed on Dec. 31, 2003.

(51) Int. Cl.
G03F 3/08 (2006.01)
G06F 17/00 (2006.01)
G06K 9/00 (2006.01)
G06K 9/34 (2006.01)
G06K 15/00 (2006.01)

(52) U.S. Cl. .................. 358/518; 715/276; 382/166; 382/180; 358/2.1

(58) Field of Classification Search .......... 358/518, 358/500
See application file for complete search history.

(56) References Cited

U.S. PATENT DOCUMENTS

| 5,542,052 A | 7/1996 | Deutsch |
| 5,659,638 A * | 8/1997 | Bengtson .................. 382/299 |
| 5,835,099 A | 11/1998 | Marimont |
| 5,926,185 A * | 7/1999 | Vyncke et al. ............ 345/619 |
| 6,034,700 A | 3/2000 | Rumph et al. |
| 6,117,305 A | 9/2000 | Bando |

(Continued)

FOREIGN PATENT DOCUMENTS

WO WO 01/71656 9/2003

(Continued)

OTHER PUBLICATIONS

Portable Document Format, Reference Manual, Version 1.3 Adobe Systems, Section 4.6.3 "Shading Patterns," pp. 212-242, 1999.

(Continued)

Primary Examiner—Twyler L. Haskins
Assistant Examiner—Barbara D Squibb
(74) Attorney, Agent, or Firm—Nelson Adrian Blish

(57) ABSTRACT

An imaging technique permits selective flattening of objects within page description files. The selective aspect of the flattening may pertain to the selection of particular objects to be flattened, selection of the degree of flattening to be applied to objects, or both. In some embodiments, selective flattening of objects in a page description file may be permitted based on an assessment of color correction efficacy. For example, the degree of flattening may be iteratively adjusted to achieve acceptable color correction results. Alternatively a user may be notified in the event acceptable color correction results have not been achieved. A color error between bitmap files generated from a color corrected, unflattened page description file and from a color corrected, flattened page description file may be measured. When the measured error between the two bitmaps exceeds a predetermined value, an amount of file flattening may be adjusted to reduce the measured error.

25 Claims, 4 Drawing Sheets

U.S. PATENT DOCUMENTS

| | | | |
|---|---|---|---|
| 6,449,053 B2 | 9/2002 | Bando | |
| 6,859,553 B1* | 2/2005 | Bourdev et al. | 382/173 |
| 7,181,687 B2* | 2/2007 | Bourdev | 715/234 |
| 2004/0100647 A1* | 5/2004 | Hatayama | 358/1.9 |
| 2004/0251430 A1* | 12/2004 | Sandstrom | 250/492.2 |
| 2005/0219577 A1* | 10/2005 | Edge | 358/1.9 |

OTHER PUBLICATIONS

ISO/CD 12639, Graphic Technology—Prepress digital data exchange—tag image file format for image technology (TIFF/IT), sponsored by the ISO working group ISO TC130/WG2 N 480, 1998.

International Color Consortium, "File Format for Color Profiles," Specification ICC.1:Sep. 1998, 1998.

Brian P. Lawler, ColorSync—Colorsync Technology Brief, "The Color Management Workflow Standard," 1999.

ScenicSoft—TrapWise, "Precision Trapping," ScenicSoft, Inc., 2000.

RamPage, Product Description V8.1, "An Open, PostScript 3-compatible workflow with in-RIP trapping, RIP-once proofing, and PDF Support."

BatchMatcherReadMe.txt, file:///C|/windows/TEMP/LOGO—BatchMatcher.html, printed Aug. 2000.

ColorBlind Parachute software manual description, file:///C|windows/TEMP/Parachute.html, printed Aug. 2000.

Adobe Illustrator 8.0, (Help Section), Using Gradients, Blends, and Patterns, "Changing gradients, blends and patterns into filled objects," pp. 1-2.

U.S. Appl. No. 09/534,824, entitled Modification of Color Values in Page Description Files, filed Mar. 23, 2000.

International Search Report and Written Opinion from International Application No. PCT/US2004/043951, mailed Jul. 28, 2005, 8 pgs.

Steven R. Bagley, David F. Brailsford and Matthew R.B. Hardy, Electronic Publishing Research Group, School of Computer Science & IT, Univerisyt of Nottingham, "Creating Reusable Well-Structured PDF as a Sequence of Component Object Graphic (COG) Elements" pp. 58-67.

* cited by examiner

SELECTIVE FLATTENING OF PAGE DESCRIPTION FILES TO SUPPORT COLOR CORRECTION

This application claims the benefit of U.S. provisional application No. 60/533,688, filed Dec. 31, 2003, the entire content of which is incorporated herein by reference.

TECHNICAL FIELD

The present invention relates to digital color imaging and, more particularly, to modification of color values in page description files.

BACKGROUND

Digital color imaging involves the reproduction of individual colors using combinations of device colors such as cyan, magenta, yellow, and black (CMYK) in the case of typical hard copy printers, or red, green, and blue (RGB) in the case of typical display monitors. To provide accurate color reproduction, the input color values provided to the output device must be precisely controlled. The color outputs of two different printers may differ significantly for identical input color values.

Similarly, common input color values may produce different color outputs for a monitor and a printer. For this reason, the color input data often is converted, or "corrected," using device calibration data to produce consistent color output from device to device. Modification of the input color values, in effect, modifies the drive values for the output device to compensate for colorimetric differences between different output devices. Color transformation is commonly used to achieve consistent color appearance, and involves pixel-based alteration of image data, e. g., CMYK->C'M'Y'K', to simulate the output of a reference device.

Page description files are often used to define color images. A page description language (PDL), such as Adobe PostScript, permits the definition of pages using complex commands and subroutines to create graphic objects. A page description format, such as the Adobe Portable Document Format (PDF), provides a file format for consistent geometric appearance of an image on different output devices. In each case, the page description file contains commands that specify particular color values and associate them with pixels within the image to be reproduced.

A raster image processor (RIP) converts the page description file to a bitmapped pixel image. A hardware RIP may be built into the output device or provided as a separate component. For some devices, the RIP is software-based. The pixel image contains the input color values that drive an output device such as a hard copy printer or a display monitor. The pixel image provides the explicit data necessary to drive the output device, while the page description file may contain explicit data and implicit commands for generation of explicit data upon RIP conversion.

Certain categories of page description objects and groups of objects are less susceptible to color conversion or correction because the color information they contain is implicit within the page description objects rather than explicitly defined. Typically, graphic arts workflows may require color conversion of single images as well as conversion of complex pages that are a composite of multiple images and vector commands such as text, geometric shapes, and complex regions which may be defined by Bezier curves.

The objects in these complex files may be similar regarding "color space." For example, all of the objects in the file may be CMYK objects defined by a standard such as SWOP (Specifications for Web Offset Publications) and further defined by a specific ICC Profile that numerically defines "SWOP." Alternatively, complex files may contain objects with different color "spaces," such as RGB, L*a*b*, and CMYK, each with unique ICC profiles or non-ICC format color definitions such as those used in PostScript page description language.

Graphic arts workflows may also require files to be converted to new color destinations, such as a specific printing standard, using an ICC profile to define the destination device or media. However, regions of the page description file that contain implicit color object definitions, such as gradient blends and transparency overlays of multiple objects, may not accurately be converted because only the "boundary conditions" are typically defined. For example, only a boundary color "A" and a boundary color "B" are typically defined in a smooth shade command to create a blend from "A" to "B," resulting in an "implicit" color command. The intermediate color values between "A" and "B" are implicitly defined by the shade function, and only become "explicit" upon RIPing the file, i.e., when the page description file is converted to a bit map file for a specific CMYK or RGB output having a specific resolution.

SUMMARY

The invention is directed to modification of color values in a page description file. In particular, the invention permits selective flattening of objects within page description files. The selective aspect of the flattening may pertain to the selection of particular objects to be flattened, selection of the degree of flattening to be applied to objects, or both. In some embodiments, the invention may permit selective flattening of objects in a page description file based on an assessment of color correction efficacy. For example, the degree of flattening may be iteratively adjusted to achieve acceptable color correction results. Alternatively, a user may be notified in the event acceptable color correction results have not been achieved.

Flattening generally refers to the conversion of complex commands or objects within a page description file that provide implicit graphics or color definitions to less complex, i.e., more primitive, commands that provide explicit graphics or color definitions. An implicit color command defining an object specifies color values indirectly, for example, by defining color as a function of other graphic information and color reference values. When a page description file, or an object contained therein, is flattened, an object generated from an implicit color command in the page description file is converted to one or more objects having an explicit color definition. In accordance with the invention, this conversion may be selectively performed to permit more accurate color correction for the object.

Similar object conversion processing associated with file flattening may occur when objects include a degree of transparency, e.g., to permit a transparency effect among overlay objects. For example, flattening may be used to remove transparency information from a page description file, by breaking overlapping transparent artwork into individual pieces, such as vectors, rasters, or both depending upon the complexity of the original artwork. Whereas the complex transparency information implicitly specifies color values, the individual pieces produced by flattening may be assigned explicit color values, permitting more accurate color correction.

The present invention may enable users to apply selective flattening to support color correction, and determine if a particular degree of file flattening results in an acceptable amount of color correction error within flattened objects contained in a page description file. In some embodiments, an error may be determined between a color corrected unflattened page description file and a color corrected flattened page description file. The error may be measured in terms of an average and maximum difference within a common color space for the flattened and unflattened versions of a page description file once the two versions of the page description file are raster image processed to a bit-mapped image having a common image resolution.

When the measured error between the flattened and unflattened versions of the page description file exceeds a predetermined value, a different amount of file flattening may be applied to reduce the measured error. Accordingly, the color correction and file flattening processes may be performed as an iterative process, with increasing degrees of flattening, until a desired color correction error threshold between the flattened and unflattened versions is satisfied.

In one embodiment, the invention is directed to a method comprising flattening a page description file with a first degree of flattening to produce a flattened version of the page description file, color correcting the flattened version of the page description file, and raster image processing the color corrected, flattened version of the page description file to produce a first bitmap. The method also comprises raster image processing an unflattened version of the page description file to produce a second bitmap and color correcting the second bitmap produced from the raster image processed unflattened version of the page description file. The method further comprises determining a color error between the first and second bitmaps.

In another embodiment, the invention is directed to a system comprising a memory that stores page description files, a processor that receives one of the page description files from the memory, and a raster image processor (RIP). The processor includes a flattening module that flattens the page description file with a first degree of flattening to produce a flattened version of the page description file. The processor also includes a color correction module that color corrects the flattened version of the page description file, and a comparison module. The RIP raster image processes the color corrected, flattened version of the page description file to produce a first bitmap and raster image processes an unflattened version of the page description file to produce a second bitmap. The color correction module of the processor color corrects the second bitmap produced from the raster input processed, unflattened version of the page description file. The comparison module determines a color error between the first and second bitmaps.

In another embodiment, the invention is directed to a computer-readable medium comprising instructions for causing a programmable processor to flatten a page description file with a first degree of flattening to produce a flattened version of the page description file, color correct the flattened version of the page description file, and raster image process the color corrected, flattened version of the page description file to produce a first bitmap. The instructions further cause the programmable processor to raster image process an unflattened version of the page description file to produce a second bitmap and color correct the second bitmap produced from the raster input processed, unflattened version of the page description file. The instructions also cause the programmable processor to determine a color error between the first and second bitmaps.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
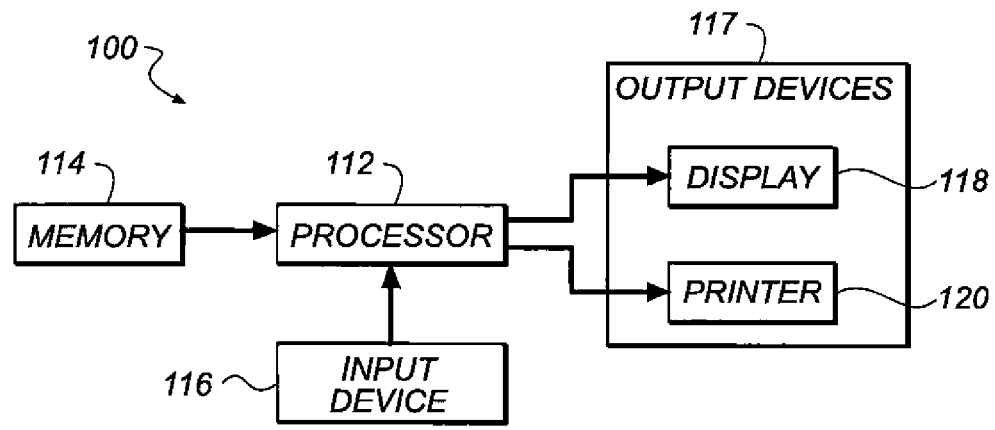
FIG. 1 is a block diagram illustrating a system for modification of color values in page description files.

FIG. 1 is a block diagram of a system 100 for modification of color values in page description files in accordance with an embodiment of the present invention. System 100 may be suitable for implementation of a method for modification of color values in page description files as described herein. In accordance with the invention, system 100 applies selective flattening to convert implicit color commands within a page description file to explicit color commands and thereby support more accurate color correction.

In some embodiments, the flattening may be selectively applied to objects defined by implicit color commands within a page description file, leaving other objects with explicit color definitions intact. In addition, as described herein, the flattening may be selectively applied with varying degrees of flattening to achieve more effective color correction. For example, the degree of flattening may be iteratively adjusted to achieve acceptable color correction results. Alternatively, a user may be notified in the event acceptable color correction results have not been achieved using the selective flattening technique.

As shown in FIG. 1, system 100 may include a processor 112, memory 114, an input device 116, and one or more output devices 117 in the form of display monitor 118, and hard copy printer 120. Memory 114 may include random access memory (RAM) storing program code that is accessed and executed by processor 112. The program code can be loaded into memory 114 from another memory device, such as a fixed hard drive or removable media device associated with system 100. In particular, the program code can be initially carried on computer-readable media such as magnetic, optical, magneto-optic or other disk or tape media, or electronic media such as electrically erasable programmable read-only memory (EEPROM). Alternatively, the program code can be loaded into memory 114 by transmission from a remote data archive, e.g., via a local area network, wide area network, or global network such as the Internet.

Processor 112 may take the form of any conventional general-purpose single- or multi-chip microprocessor or a special purpose microprocessor. Input device 116 may include a conventional keyboard and pointing device such as a mouse or trackball, if desired, as well as speech recognition hardware and software or other input media. Display 118 may take the form of a CRT, flat panel, or other conventional display that provides text and/or graphic output to the user. Printer 120 may take the form of an inkjet, dye sublimation, electrographic, electro-photographic, photographic, thermographic, photo-thermographic, or other conventional hard copy printer.

Other output media such as electronic paper are also contemplated. Further, processor 112, memory 114, input device 116, display 118, and printer 120 may be integrated with or form part of a personal computer or computer workstation, and may operate in a conventional operating system environment such as Windows®, Macintosh®, Unix™, or Linux®. To facilitate communication and sharing of image files between remote users, and downloading of program code as described above, this environment may be networked.

Figure 2:
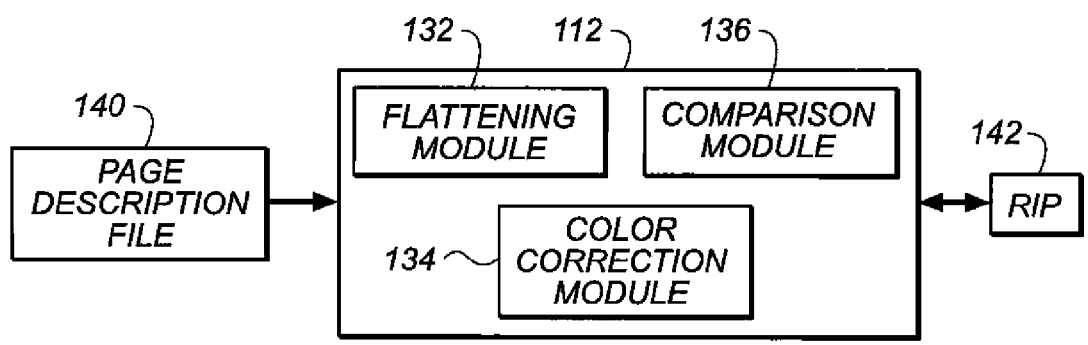
FIG. 2 is a block diagram illustrating portions of the system of FIG. 1 in further detail.

FIG. 2 is a block diagram illustrating portions of system 100 in further detail. Processor 112 includes a flattening module 132, a color correction module 134, and a comparison module 136. In operation, processor 112 receives a page description file 140 from memory 114. As an example, page description file 140 may be an Adobe Postscript or Adobe Acrobat file. Page description file 140 may include page description language (PDL) commands that define an image for reproduction on display 118 or printer 120. Various versions of these PDL commands have been developed over time. Newer versions of the PDL commands typically include all PDL commands from earlier versions of the PDL along with additional commands used to support new features of the PDL.

In some cases, processor 112 may convert page description file 140 from a newer version of the PDL to an earlier version of the PDL in order to render page description file 140 compatible with an output device 117, such as display 118 or printer 120. For example, earlier PDL versions may not support certain complex objects or transparency information. This conversion process from one version of a PDL to an earlier version of a PDL, which may involve conversion of implicit commands to explicit commands, is typically referred to as flattening. Flattening can be exploited more generally, however, to support color correction in accordance with the invention.

Flattening module 132 may be implemented as a process within a dedicated flattening system. Alternatively, flattening module 132 may adapt and control a flattening process already provided in an existing software application. As an example, flattening module 132 could be configured to invoke the flattening engine provided in a document editing software application such as Adobe Acrobat Pro. Hence, flattening module 132 may be configured for either direct flattening of objects within a page description file, or indirect flattening by invoking and controlling an external flattening process.

As one example of a flattening process, a page description file may be fully raster image processed (RIPed) to a bit-mapped image, as a bit-mapped image file is typically supported by all versions of PDLs. This approach to file flattening is typically not optimal, however, as generation of the bit-mapped image file requires a large data file to represent the page description file.

An alternate form of file flattening may be utilized where a processor manipulates only a selected portion of a page description file to flatten that portion of the page description file. In accordance with the present invention, flattening may be implemented by flattening module 132 on a selective basis to support selection of particular objects to be flattened, as well as the selection of the degree of flattening to be applied.

One example of a processing system in which only a portion of a page description file is flattened by converting implicit color commands to explicit color commands is described in commonly assigned U.S. patent application to Edge et al., entitled MODIFICATION OF COLOR VALUES IN PAGE DESCRIPTION FILES, Ser. No. 09/534,824, filed Mar. 23, 2000, the entire content of which is incorporated by reference herein.

In the commercially available Adobe Acrobat Pro document editing application, mentioned above, the degree of flattening may be controlled by adjusting the raster/vector slider in the Flattener Settings. Flattening results in conversion of page description file 140 from a first file format to a second file format. The first file format is an original, unflattened file format, and the second file format is a flattened file format. In some embodiments, flattening module 132 may permit selective flattening of objects in page description file 140 based on an assessment of color correction efficacy performed by comparison module 136, and selection of different degrees of flattening on an iterative basis until desired color correction results are achieved.

Selective flattening can be applied prior to RIPing the pertinent page description file. A raster image processor (RIP) 142 may include a hardware RIP built into either display 118 or printer 120, a stand-alone hardware RIP, or a software-based RIP. In any case, RIP 142 executes page description instructions and produces a bitmapped pixel image that drives monitor 118 or printer 120 to reproduce a multi-color image. Sources of commercially available RIPs include Adobe Systems Inc. and Harlequin Limited.

Prior to application of RIP 142, it may be desirable to apply page description file 140 to color correction module 134 in order to modify color values within page description file 140 so that the pixel image, when executed by display 118 or printer 120 to form an image, produces color output that substantially matches a desired reference output. In the illustrated embodiment, the modification takes place by user selection of color correction module 134. In other embodiments, the modification may take place by sending page description file 140 to a virtual printer or color server.

In some cases, the modified file can be stored in RAM and sent to an actual printer as the conversion takes place. By modifying color values within page description file 140, processor 112 can produce a file that, when subject to full RIP conversion via RIP 142, produces a pixel image that compensates for device-dependent color deviation in display 118 or printer 120. In this manner, consistent visual color output can be achieved from device to device.

Since flattening module 132 may flatten page description file 140 prior to application of color correction module 134, the visual output generated in display 118 or printer 120 may not produce a desired result. The degree and nature of the flattening applied to page description file 140 may adversely affect the ability of processor 112 and color correction module 134 to accurately perform color correction processing. Accordingly, color correction module 134 may be configured to process page description file 140, both in its original form and its flattened form, to determine whether a desired level of color correction accuracy is possible once page description file 140 has been flattened to a particular degree.

When comparison module 136 determines that the level of color correction accuracy possible once a file is flattened is less than a predetermined amount of possible color correction, processor 112 may alter the file flattening performed by flattening module 132 in order to provide a desired amount of color correction in the flattened file. In particular, processor 112 may direct color correction module 134 to perform a desired color correction to both the unflattened page description file and the flattened page description file.

Comparison module 136 may then compare the two color corrected files generated by this process to determine an amount of color difference in the color corrected flattened file from a presumably correct color corrected unflattened file. When comparison module 136 determines that the amount of color difference in these two color corrected files is greater than a predetermined amount of color difference, i.e., an error threshold, processor 112 may determine that the flattened file does not sufficiently represent output corresponding to the original page description file. In these cases, processor 112 may alter the amount, nature, or both, of file flattening applied via flattening module 132 to original page description file 140 to obtain a desired level of color compatibility between the flattened and unflattened page description files.

For example, the degree of flattening may be selectively or automatically increased so that complex objects, transparency information, or other information containing implicit color commands is broken into more primitive objects with finer granularity. The objective in this case may be to produce a flattened file that is effective in reducing color correction deviation between the flattened file and the unflattened file.

In various embodiments, flattening module 132 within processor 112 may perform selective flattening on page description file 140, as will be further described herein below. Some of these selective flattening solutions may utilize an adjustable parameter to indicate whether to flatten none of the file, some of the file, most of the file, or the entire file. Because the selection of a "degree of flattening" may range between 0%-100%, it may be desirable to provide a high degree of certainty that a particular file flattening process, including specific values of adjustable parameters if any exist, is effective in achieving acceptable color correction results for a particular page description file or for a class of page description files. A class of page description files may include files which are consistently generated by a particular page layout application with certain preference settings.

Current products exist such as Kodak Polychrome Graphics Matchflow Composer, which can accomplish a goal of "flattening" in an extreme way by RIPing the entire page description file to essentially continuous tone data, e.g., typically 300 dpi for the "photographic" objects, and line-work data, e.g., typically higher resolution by a factor of 6, i.e., 1800 dpi. The resulting RIPed file is explicit and can be color converted with no ambiguity because all objects within the file are explicit in terms of color as well as geometric shape and position.

There may be some negative aspects to an approach that involves RIPing the entire page description file, as is the case when the Matchflow Composer product is used for flattening. As an example, the resulting file is often much larger than the original page description file. In addition, the time to RIP the resulting file at an image-setter, plate-setter, or proofer may be 3 to 10 times longer than RIPing the original page description file. Also, once extreme flattening is performed, it is no longer possible to edit text in the resulting file, i.e., it is no longer a "smart" page description file. Due to all the above issues, the resulting file is no longer optimal for use on the World Wide Web.

Thus, in accordance with the invention, an alternate system for page description file flattening is provided to perform "selective flattening." Selective flattening may involve converting only those regions that require flattening in order to perform accurate color correction, and may leave untouched those regions that do not require flattening for effective color correction. For example, text that is set to a single color value, whether black or some other tinted combination of CMYK, may be left in the form of a simple editable string that does not require flattening. Upon color conversion, only the color value associated with the text would be modified. In this manner, the text has not been RIPed or flattened and can still be modified within the page description file. This simple example is valid unless the text object overlaps another object and a degree of transparency has been activated.

In contrast, a more complex object, such as a smooth shade function, may implicitly define a range of colors extending from a set of boundary colors. To achieve more accurate color correction, the selective flattening process can be applied to identify the implicit command, e.g., a smooth shade function, and flatten it to produce a set of objects that explicitly define color across the shading range. In this manner, more accurate color correction can be achieved by flattening implicit color commands on a selective basis, while leaving intact those commands or objects that provide sufficient explicit color commands or information.

Figure 3:
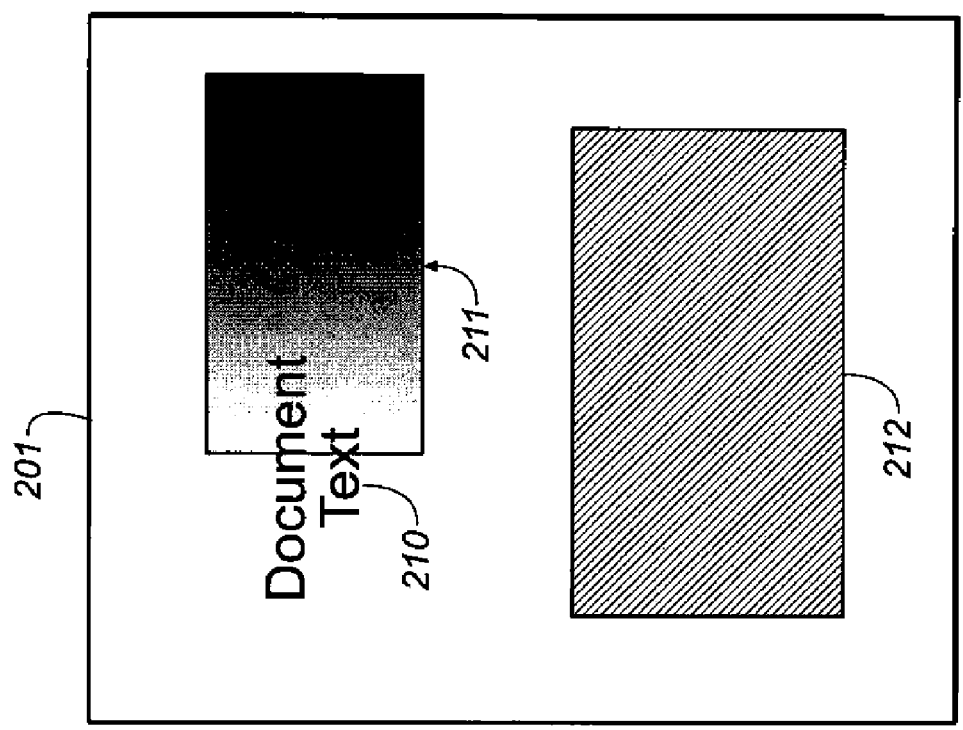
FIG. 3 is a diagram illustrating a rendering of a page description file containing regions of implicit color commands requiring selective flattening as part of color correction according to an embodiment of the invention.

FIG. 3 is a diagram illustrating a rendering of a page description file containing regions of implicit color commands requiring selective flattening as part of color correction according to an embodiment of the present invention. The selective flattening technique processes the contents of a page description file 201 to identify regions of a page rendered from the page description file 201 in which flattening is beneficial. For example, region 211 contains shading that varies over the entire region, whereas region 212 contains a single fill color. Hence, for purposes of color correction, the single fill color may be color corrected for the entire region 212. In this case, flattening of region 212 would not be beneficial to color correction efficacy.

In region 211, however, a range of colors is defined implicitly by a shading function. An example of a shading function is the SmoothShade function that may appear in an Adobe Postscript or Adobe Acrobat file. The shading is defined in terms of boundary colors at the edges of region 211 and a shading function between the edges. Region 211 possesses shading that transitions from white to black between its opposing edges. In other instances, region 211 may comprise other types of shading, such as shading that transitions from white to black and back to white between its opposing edges. In the illustrated example, a black color shading may be defined in terms of CMYK coordinates as 0% C, 0% M, 0% Y and 100% K. Similarly, a white color shading may be defined in the CMYK coordinates 0% C, 0% M, 0% Y and 0% K. Any such shading of a region is applicable to the processing described herein.

In addition to shading regions, such as region 211, page description files may contain overlapping items that present color correction problems. For example, a text object 210 may overlap a second object, such as a shaded region 211. The combination of objects may also include a degree of transparency for the overlapping objects in which color rendered for the page depends upon the color for the objects when combined in some manner.

When the degree of transparency is defined as 0%, none of the color from a background object is seen in a combined object. As such, the color correction needed for a flattened page description file corresponds to the color correction needed for the objects when not combined. In contrast, color from the background object is seen bleeding through a foreground object when the degree of transparency is a value greater than 0%. In this latter case, the color for the combined object corresponds to the color of the background object, which may require color correction, the color for the foreground object, which may also require its own color correction, and then an application of the degree of transparency to determine an amount of color from the background object that is seen through the foreground object.

When overlapping objects having a non-zero degree of transparency are flattened, color values for pixels within the combined object are typically rendered as a bit-mapped image. As such, color correction of the combined object prior to flattening may result in a different result from color correction applied to the page file after a flattening process has been applied to the page description file. In addition, the degree of flattening may have a significant impact on color correction results. The difference in these two rendered pages, as measured in a comparison of pixels in raster image processed versions of both files, represents possible color rendering errors arising from the file flattening. The location and amount of this error may be significant in determining whether file flattening is detrimental to obtaining a desired output when rendered upon display 118 or printer 120.

Figure 4:
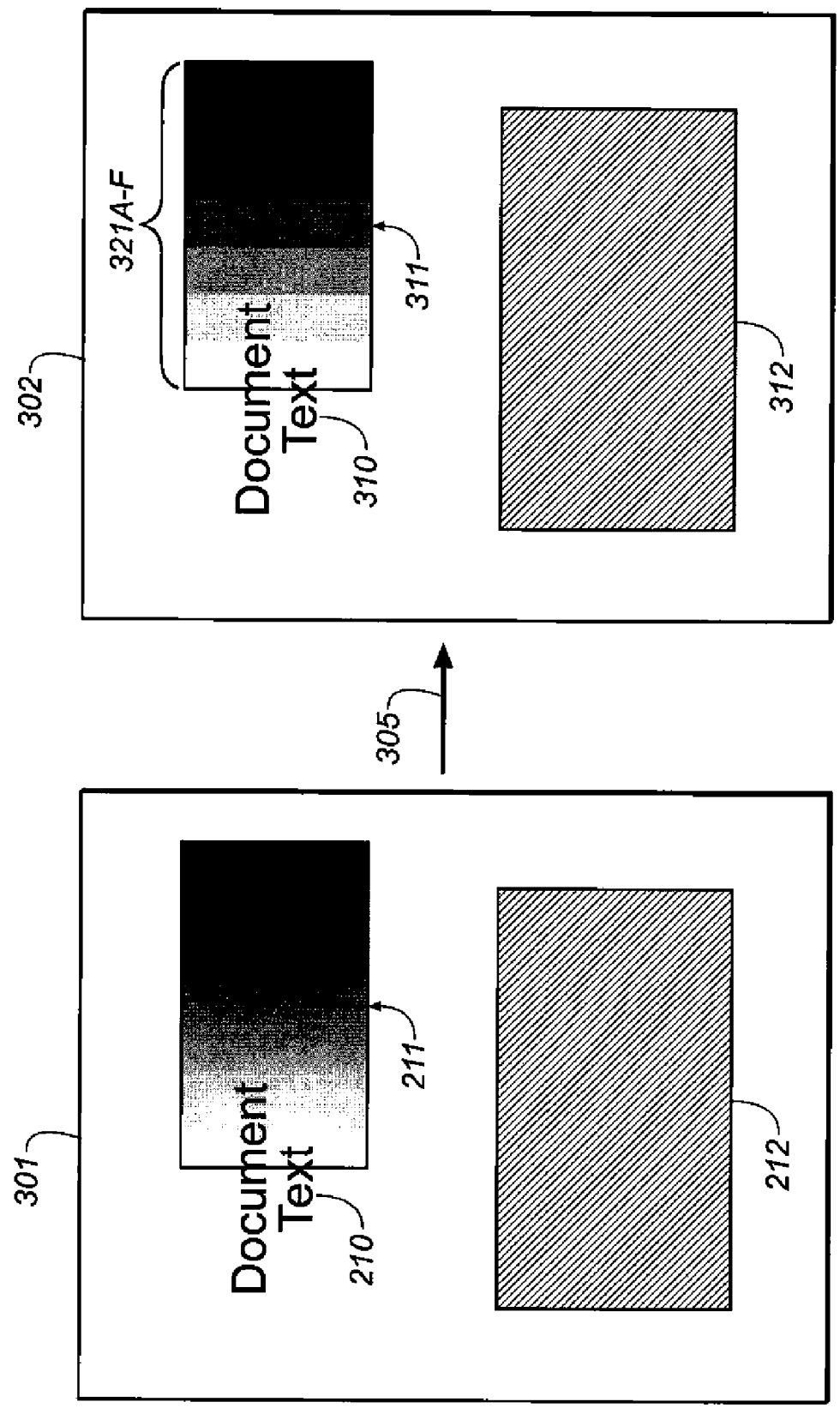
FIG. 4 is a diagram illustrating a rendering of a selectively flattened page description file containing a region of explicit color commands converted from a region of implicit color commands according to an embodiment of the present invention.

FIG. 4 is a diagram illustrating a rendering of a selectively flattened page description file containing a region of explicit color commands converted from a region of implicit color commands according to an embodiment of the present invention. Selective flattening results in conversion of an unflattened first page description file 301 to a selectively flattened second page description file 302. In this example, the original, unflattened page description file 301 includes a combined object 303 consisting of a text object 210 and a shaded region 211. In addition, page description file 301 defines a solid region 212.

Page description file 301 is processed into a flattened page description file 302, as indicated by line 305. In particular, combined object 303 is processed to produce a flattened text object 310 and a flattened shaded region 311. In some embodiments, solid region 212 may be processed into a flattened solid region 312. However, in the case of selective flattening, where the contents of a page description file 201 are processed to identify regions in which flattening is beneficial to color correction, solid region 212 may be processed into an unflattened solid region 312. In other words, because solid region 212 is specified by a single fill color, flattening this region would provide no further advantage in terms of color correction.

However, flattening of object 303 is beneficial to color correction efficacy because it permits the object to be represented by a plurality of spatial sub-objects with explicit color definitions, rather than by a function that implicitly defines color across the object. In this manner, the explicit color value for each sub-object can be color corrected, instead of just the boundaries or end points of a shading function. In this example, the flattened shaded region 311 approximates unflattened region 211 with a series of equally sized shaded regions 321A-F in which each region contains a separate explicitly defined color indicative of a level of shading. In this manner, flattened region 311 produces a series of regions 321A-F that are explicitly assigned different color values. The color values for the pixels within each of shaded regions 321A-F are determined upon processing shaded region 211 into flattened shaded region 311.

The number of shaded regions 321A-F into which flattened shaded region 311 is divided when the flattening processing is applied may be controlled by a parameter representing a degree of flattening. The color value for the pixels within each of shaded regions 321A-F is determined by selecting explicit color values along a shading curve between the color values used to define the color values of the edges for shaded region 211. In this manner, the explicit color values can be color corrected on an individual basis, with the objective of improving color correction efficacy. Additional details of an embodiment for a processing system in which an implicit color command is converted into an explicit color command to facilitate color correction is described in the aforementioned Edge et al. application.

Commercially available software products may be adapted and used to apply selective flattening, with different degrees of flattening, in accordance with the invention. For example, commercially available software products can be used to transform page description files from a PDF file specification to a PostScript file specification. Basic software components residing in existing Adobe software products and libraries, such as the Adobe Acrobat Pro product version 6.0, provide this PDF export function. This PDF transformation function, which is also referred to as an export function, allows a user to convert page description files in a more recent PDF version to an earlier version of PostScript for use in older image-setters or other software packages. Many of these older software packages may utilize an EPS (Encapsulated PostScript) input file rather than a more recent PDF input file.

In conjunction with this file transformation function, Adobe Acrobat Pro version 6.0 offers a preferences window that allows a user to set a degree of flattening for use during this processing. This preference setting window may be used with multiple overlapping objects which have been placed in the file in conjunction with relatively new options such as transparency. The flattening option processes the page description file to rasterize selected regions of the page that require flattening such as, for example, areas that contain color blends and/or transparency. The option allows the user to determine parameters such as the resolution of the rasterized area. This option also permits a setting of the "degree of flattening" which is typically set to 75% as a default. The rasterized content provides an explicit color definition for selected objects or regions within the page.

Hence, the flattening option residing in a product such as Adobe Acrobat Pro version 6.0 can be adapted to provide an engine for selective flattening in accordance with the invention. In particular, the flattening option can be used under the control of a selective flattening process, as described herein. The flattening option also may be used on an iterative basis in some embodiments to evaluate color correction efficacy using different degrees of flattening for the selected objects.

Many of the objects and commands of the type that have been the concern of the color correction processing described herein are often higher-level commands that were added in later revisions of both PostScript and PDF. For example, commands for drawing text with certain fonts at certain angles and positions began to appear in very early versions of PostScript and PDF. These commands generally have no negative impact when converting color values in the page because a single, explicitly defined color value is used for drawing the object. However, complex color commands such as SmoothShade were only added to PDF during the version 1.4 revision, which came several years after version 1.0.

Thus, many of the export functions that one would expect to see in applications such as Acrobat Pro that create earlier or more primitive versions of PostScript or PDF can be used by flattening module 132 to approximate the desired functionality of an ideal selective flattener. Using this type of processing software, a PDF file may be exported to PostScript via the export feature of Acrobat Pro and subsequently converted back to PDF via Acrobat Distiller. The page description file, which contained a complex SmoothShade object as well as text, may experience significant modifications to the SmoothShade object due to flattening with a Flattening Value set to the default of 75%. The page description file may result in a somewhat larger file size for the flattened file. However, editable text remains unchanged, and can be edited using processing programs such as Adobe Acrobat both before and after the above procedure.

Figure 5:
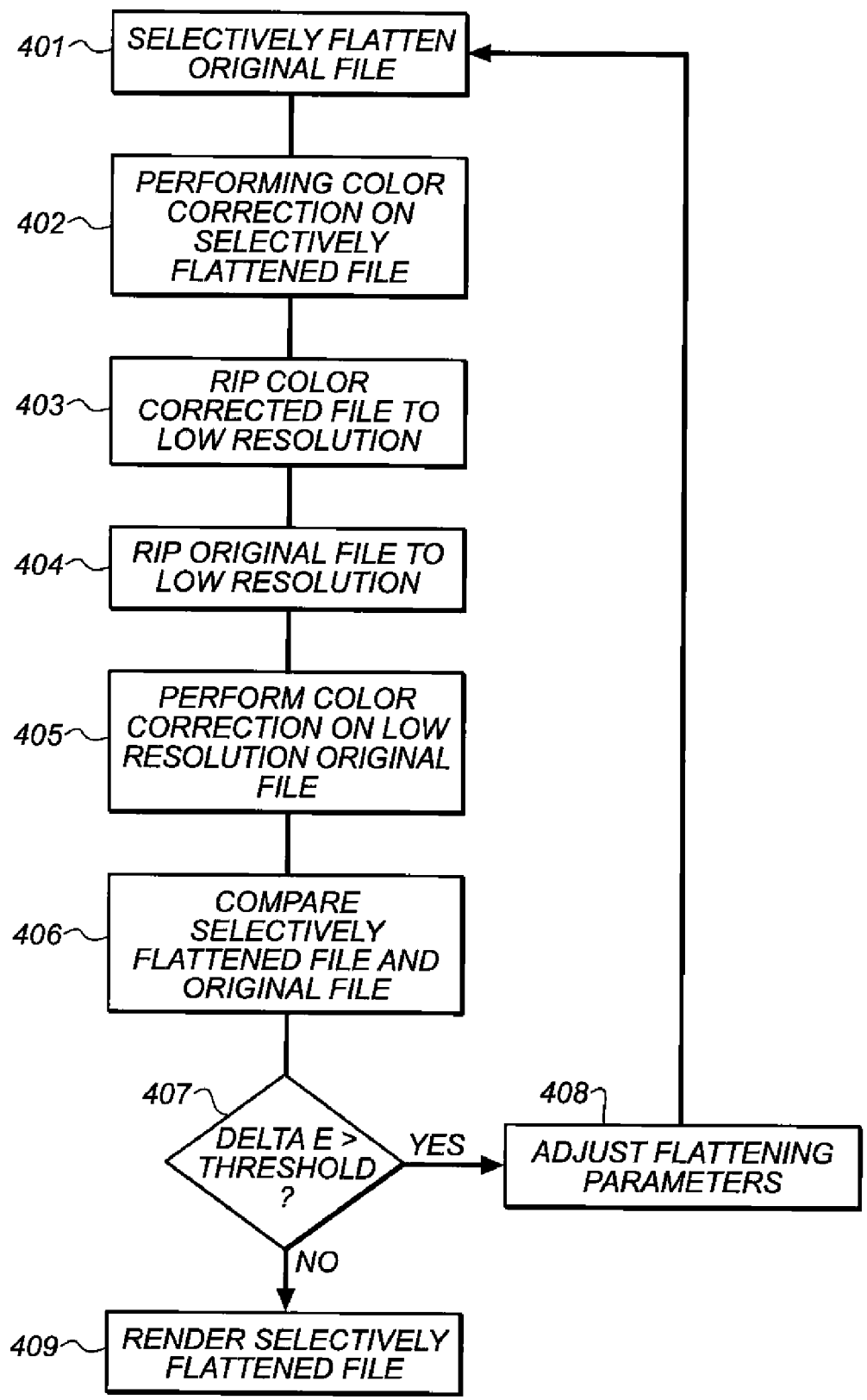
FIG. 5 is a flow diagram illustrating a method for modification of color values in a page description file.

FIG. 5 is a flow diagram illustrating a method for modification of a page description file using selective flattening according to an embodiment of the present invention. The file flattening and color correction process illustrated in FIG. 5 may be applied to system 100 described in FIGS. 1 and 2. FIG. 5 represents an iterative process in which different degrees of flattening are applied to page description file until a desired degree of color correction efficacy is achieved. In this manner, flattening settings can be selected to ensure color correction efficacy. In some embodiments, color correction efficacy may be evaluated in terms of error between the color correction output of the flattened page description file and the color correction output of a fully RIPed page description file.

Flattening module 132 within processor 112 selectively flattens original page description file 140 with a first degree of flattening (401) to convert page description file 140 from a first (unflattened) file format to a second (flattened) file format. Selective flattening may involve selection of objects defined by implicit color commands, and flattening to convert the implicitly color commands into a series of explicitly color commands directed to spatial sub-objects of each selected object.

Color correction module 134 color corrects the contents of the flattened page description file. The color correction may involve the use of a from a source device profile, e.g., Profile A, a destination device profile e.g., Profile B, and a profile connecting space (PCS) (402). Color correction module 134 includes a particular color management module (CMM) and settings for rendering. The profiles and color management module may be defined according to ICC specifications. Following flattening and color correction, RIP 142 then RIPs the flattened and color corrected page description file to produce a first bitmap image (403). The first bitmap image may comprise a low resolution in order to reduce processing time. For example, the first bitmap image could have a resolution of 72 dpi continuous tone.

RIP 142 then RIPs the original unflattened page description file 140 to produce a second bitmap image. The second bitmap image may have the same low resolution used when generating the first bitmap image of the flattened page description file (404). Color correction module 134 within processor 112 color corrects the resulting second bitmap image for the original unflattened page description file using the same profiles, CMM and rendering settings (405). In this case, the bitmap image produced from the unflattened page description file, rather than the contents of the page description file, is color converted.

Comparison module 136 within processor 112 compares the two resulting color corrected files of the first bitmap image and the second bitmap image (406), i.e., the flattened, color corrected, and RIPed file and the unflattened, RIPed, and color corrected file, respectively. As an example, the comparison may be performed by first converting the bitmap images to L*a*b* color with the same profile and calculating an average and a maximum delta E error between the pixel color values within the two bitmap image files.

Small differences between the flattened and unflattened files indicate that the specified degree of flattening used by flattening module 132 is adequate. For example, one delta E or less, i.e., 1% in device coordinate space, may represent an acceptable amount of color correction error due to flattening. In order to adequately determine an effect from flattening, the source and destination profiles should differ significantly in properties for the above comparison to be meaningful over a wide range of page description files. For example, the destination profile may be selected to require a +20% correction to the mid-tone characteristic in the one dimensional lookup tables (LUTs) used for the color correction. In one test using SmoothShade examples provided by Adobe, a 20% value for pixel discrepancies was observed between the two created files when profiles differing by 20% were used in conjunction with flattening set to 0.

When a delta E error is less than a predetermined threshold value (no branch of 407), the selectively flattened, color corrected file is suitable for rendering (409). In this case, the degree of flattening is acceptable. When delta E is detected to be greater than the predetermined threshold value (yes branch of 407), flattening parameters may be adjusted (408) and the processing may be repeated using a newly flattened page description file (401). In the above example, different options could be offered in the event of a significant error being detected.

A first option may be to automatically increase the degree of flattening, for example from 75% to 90%, or from 50% to 75%, and try again. In this case, the degree of flattening may be increased in fixed steps on an iterative basis. A further option may be to automatically determine an increase in the degree of flattening based on the degree of error detected between the flattened, color corrected file and the unflattened, color correct file. In particular, the increase in the degree of flattening may be determined in proportion to, or as a function of, the error value. Alternatively, a third option may be to prompt a user for input concerning the increase in the degree of flattening. Hence, a selective degree of flattening may be applied, either in response to user input or automatically in the event color deviation is not satisfied.

Note that the "degree" or "amount" of flattening may be accomplished in a manner identical or similar to manipulation of the "raster/vector slider" in the Flattener Settings of Adobe Acrobat Pro. Also note that in the user interface for this feature in Adobe Acrobat Pro, the "raster/vector slider" indicates that 0% on the left side of the slider is labeled as "raster" and the 100% on the right side of the slider is labeled as "vector." Accordingly, the term "degree of flattening" used in the description of this invention may be communicated as "degree of non-flattening" or "degree of non-rasterization" according to the Adobe Acrobat Pro user interface. Also, the raster/vector slider in Adobe Acrobat provides an example of a tool for parametric control of the degree of flattening. Hence, a value of 0% in the Adobe slider settings would correspond to 100% flattening. In any case, flattening module 132 may be configured to manipulate or invoke the flattening engine, and the degree of flattening adjustment, provided within an existing software application, such as the Adobe Acrobat Pro product, in order to support selective flattening.

The Adobe Acrobat documentation indicates that the degree of selective rasterization will depend on the complexity of the page, available RAM, and other factors. Based on external tests, one can surmise the following:

(a) The "raster/vector slider" appears to apply primarily to groups of objects that may potentially be involved in overlapping regions containing transparency.

(b) The "gradient resolution" parameter, i.e., the resolution of smooth shades and gradients which are converted to raster, appears to relate primarily to converting gradients and smooth shade objects to raster as determined by the "Postscript version" setting in the "General Options" window.

The above observation was made as follows: the Postscript file "Gradient Mesh" in the examples folder of Adobe Illustrator was converted to PDF using Adobe Distiller. The Preflight feature of Acrobat Pro confirmed that the resulting PDF file contained many "smooth shade" objects. This file was converted to Postscript using the "Save as" feature in Acrobat Pro and reconverted to PDF using Distiller.

Performing the above operation with default settings in "transparency flattening" settings and Postscript set to Level III in the General settings windows for converting to Postscript resulted in a new PDF file similar to the original, i.e., it contained many "smooth shade" objects. Performing the above with Postscript set to Level I or Level II always resulted in a new PDF file that contained no smooth shade objects, even if the "degree of flattening" was set to 100% vector, i.e., no rasterization. Hence, it appears that to ensure gradients are converted to raster, Postscript Level I or II should be selected. To ensure that transparent overlaps are adequately rasterized, the "raster/vector slider" should be set to an adequately low setting to ensure that an adequately high degree of flattening is occurring.

In some embodiments, as mentioned above, the flattening may be applied with different degrees on an iterative basis until desired results are achieved. A second option may be to communicate to the user via an Alert window or other communication that the test indicated failure, i.e., failure to satisfy a desired color correction error level, at which point the operator could decide on the next course of action. An iterative process of varying the degree of flattening and then determining whether an acceptable delta E error is observed may be used to determine an acceptable degree of flattening for any particular page description file.

In the case of failure for high degrees of flattening such as 75%-90%, the processing may automatically process the file using KPG MatchFlow Composer or similar technology that would have the advantage of preserving the quality of high resolution data such as text as well as the low resolution CT information. The disadvantages, as indicated above, would include a large file size and slow processing times during output of the page; however, enhanced color accuracy could be achieved. In this case, a full RIP approach could be used in limited instances in which selective flattening fails to produce an acceptable result.

In an alternate embodiment, a system may automatically determine which regions within a page description file require flattening and which regions do not. Such a system may also retain the positive smooth characteristics of SmoothShade commands and GradientBlend objects by sub-dividing the object via control points or by dividing the object into smaller objects that are sub regions of the original. Again, such an implementation may be similar to that described in the aforementioned Edge et al. application.

However, when such "intelligent" methods are not available due to their complexity, it may be adequate for certain applications to adapt software, such as Adobe Acrobat Pro, intended for use in exporting to earlier versions of page description language as a means of performing selective flattening for purposes of converting colors accurately in a PDF format file. By performing the test described above, the user or the system can confirm that acceptable results will be obtained for a given page description file or a class of files. In the event that the answer to the test is negative, a more aggressive form of flattening can be used and the test repeated to ensure expected results.

Note that one option for flattening gradient or smooth shade objects may be to recreate a similar object which includes multiple reference points for intermediary colors that are generated. If the object is fundamentally one-dimensional (1D) in terms of color blending, a linear array of CMYK or RGB values ranging between the boundary values of the object could adequately define the intermediary colors. If the gradient is fundamentally two-dimensional (2D), i.e., is bounded by multiple color borders, then some form of 2D grid reference points can be used. This option for recreating an object such that the colors are adequately explicit before RIPing assumes the support for such reference color points in the page language or format.

Various embodiments of the invention have been described. These and other embodiments are within the scope of the following claims.

The invention claimed is:

1. A method comprising:
   flattening a page description file with a first degree of flattening to produce a flattened version of the page description file;
   color correcting the flattened version of the page description file;
   raster image processing (RIPing) the color corrected, flattened version of the page description file to produce a first bitmap;
   raster image processing (RIPing) an unflattened version of the page description file to produce a second bitmap;
   color correcting the second bitmap produced from the raster input processed, unflattened version of the page description file; and
   determining a color error between the first and second bitmaps.

2. The method of claim 1, further comprising flattening the page description file with a second degree of flattening when the color error exceeds a threshold value, wherein the second degree of flattening is greater than the first degree of flattening.

3. The method of claim 1, further comprising approving the first bitmap for rendering when the color error is less than a threshold value.

4. The method of claim 1, further comprising notifying a user of the color error when the color error exceeds a threshold value.

5. The method of claim 1, wherein flattening includes converting at least some objects in the page description file with implicit color definitions to objects with explicit color definitions.

6. The method of claim 1, wherein the color error comprises an average difference and a maximum difference between color values for pixels in the first and second bitmaps.

7. The method of claim 1, wherein the page description file comprises a Portable Document Format (PDF) file or a Postscript (PS) file.

8. The method of claim 1, further comprising iteratively flattening the page description file with increasing degrees of flattening until the color error is less than a threshold value.

9. The method of claim 1, further comprising flattening the page description file with a degree of flattening using raster and vector settings in a document editing application.

10. The method of claim 1, wherein color correcting the flattened version of the page description file includes converting color values within the flattened version of the page description file using a source profile and a destination profile.

11. A system comprising
   a memory that stores page description files;
   a processor that receives one of the page description files from the memory, the processor including:
      a flattening module that flattens the page description file with a first degree of flattening to produce a flattened version of the page description file, a color correction module that color corrects the flattened version of the page description file, and a comparison module;

a raster image processor (RIP) that raster image processes the color corrected, flattened version of the page description file to produce a first bitmap and raster image processes an unflattened version of the page description file to produce a second bitmap, wherein the color correction module of the processor color corrects the second bitmap produced from the raster input processed, unflattened version of the page description file and the comparison module determines a color error between the first and second bitmaps.

12. The system of claim 11, wherein the flattening module flattens the page description file with a second degree of flattening when the color error exceeds a threshold value, wherein the second degree of flattening is greater than the first degree of flattening.

13. The system of claim 11, wherein the processor approves the first bitmap for rendering when the color error is less than a threshold value.

14. The system of claim 11, wherein the processor notifies a user of the color error when the color error exceeds a threshold value.

15. The system of claim 11, wherein the flattening module converts at least some objects in the page description file with implicit color definitions to objects with explicit color definitions.

16. The system of claim 11, wherein the color error comprises an average difference and a maximum difference between color values for pixels in the first and second bitmaps.

17. The system of claim 11, further comprising an input device, wherein the input device comprises one of a keyboard, a mouse, a trackball, or a speech recognition device.

18. The system of claim 11, further comprising an output device that includes the raster image processor, wherein the output device comprises one of a hard copy printer or a display monitor.

19. The system of claim 11, further comprising an output device that includes the raster image processor, wherein the raster image processor comprises a stand-alone raster image processor.

20. The system of claim 11, wherein the page description file comprises a Portable Document Format (PDF) file or a Postscript (PS) file.

21. The system of claim 11, wherein the flattening module iteratively flattens the page description file with increasing degrees of flattening until the color error is less than a threshold value.

22. The system of claim 11, wherein the flattening module flattens the page description file with a degree of flattening using raster and vector settings in a document editing application.

23. The system of claim 11, wherein the color correction module converts color values within the flattened version of the page description file using a source profile and a destination profile.

24. A computer-readable medium comprising instructions for causing a programmable processor to:

flatten a page description file with a first degree of flattening to produce a flattened version of the page description file;

color correct the flattened version of the page description file;

raster image process (RIP) the color corrected, flattened version of the page description file to produce a first bitmap;

raster image process (RIP) an unflattened version of the page description file to produce a second bitmap;

color correct the second bitmap produced from the raster input processed, unflattened version of the page description file; and determine a color error between the first and second bitmaps.

25. The computer-readable medium of claim 24, further comprising instructions for causing a programmable processor to flatten the page description file with a second degree of flattening when the color error exceeds a threshold value, wherein the second degree of flattening is greater than the first degree of flattening.

* * * * *